March 27, 1956   E. P. TURNER   2,739,680
ELECTRIC POWER TRANSMITTERS
Filed May 1, 1952

WITNESS
Nicholas Leszczak

INVENTOR.
Edgar P. Turner
BY
William P. Stewart
ATTORNEY

United States Patent Office 2,739,680
Patented Mar. 27, 1956

2,739,680

ELECTRIC POWER TRANSMITTERS

Edgar P. Turner, Fanwood, N. J., assignor to The Singer Manufacturing Company, Elizabeth, N. J., a corporation of New Jersey Application May 1, 1952, Serial No. 285,503

7 Claims. (Cl. 192—18)

This invention relates to electric clutch-brake driving devices and more particularly to a clutch and brake mechanism and actuator for such devices.

An object of this invention is to provide an improved electric clutch-brake driving device with a normally engaged brake.

Another object of the invention is to provide a means for adjusting the pressure applied to engage the brake.

A further object of the invention is to provide a clutch-brake driving device with a brake-engaging spring assembly which can be readily removed.

Figure 1:
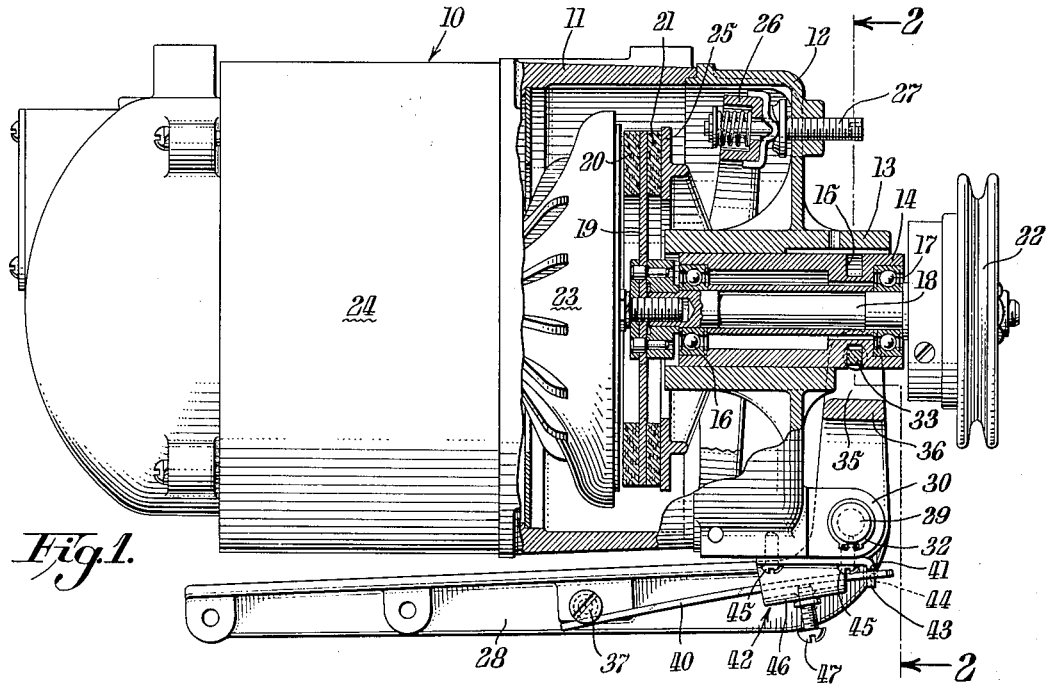
Fig. 1 is a front view, partly in section, of a clutch-brake driving device embodying the invention.
Figures 2, 3:
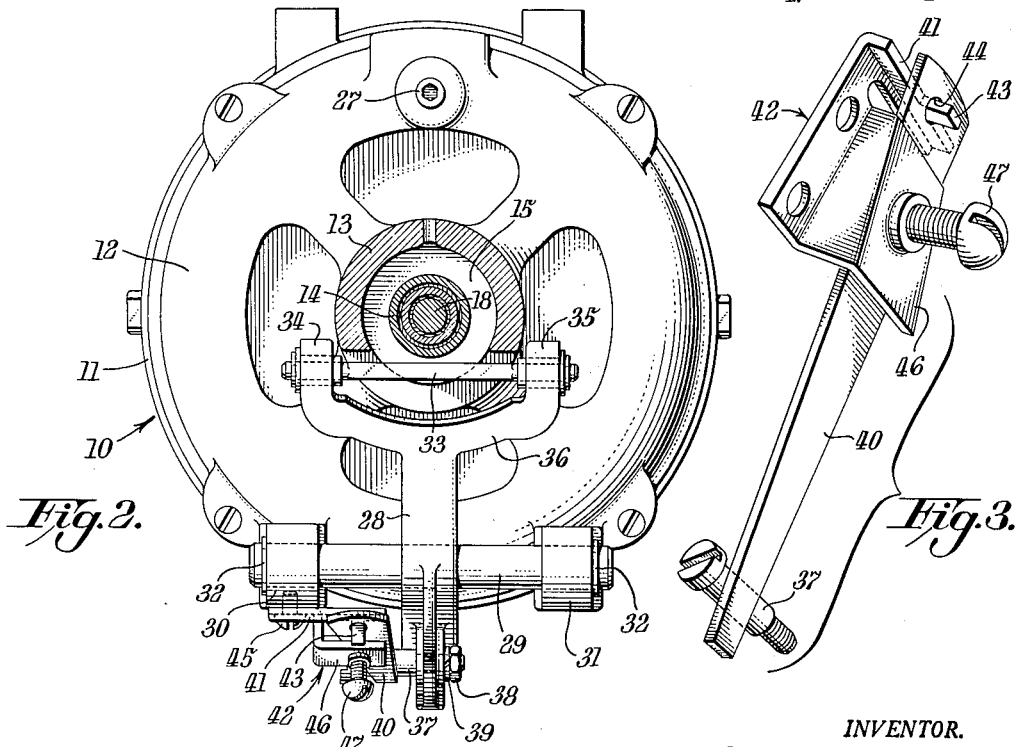
Fig. 2 is a view taken substantially on the line 2—2 of Fig. 1.
Fig. 3 is a perspective view of the brake engaging spring assembly.

The transmitter 10 comprises a casing 11 closed at one end by an end cap 12 which is formed with a central support bearing 13. A control sleeve 14 is rotatably and slidably mounted in the bearing 13 and is formed with a circumferential groove 15 in its outer surface near one end. Two ball bearings 16 and 17 are carried by the sleeve 14 and rotatably support a driven shaft 18. A friction disc 19 is fastened to the inner end of the driven shaft 18 and carries a clutch ring 20 of friction material on one side and a brake ring 21 of friction material on the other side. A driven pulley 22 is fastened to the other end of the shaft 18. The clutch ring 20 is engageable with a rotatable driving element or flywheel 23 driven by an electric motor 24. The brake ring 21 is engageable with a brake element 25 which is supported by an adjusting lever 26 and adjusting mechanism 27 in a manner similar to that disclosed in the copending Turner application.

The clutch and brake mechanism is operated by an actuating lever 28 carried by a pivot pin 29. The pivot pin 29 is supported in bosses 30 and 31 formed on the end cap 12 and is restrained against axial motion relative to the bosses 30 and 31 by spring rings 32. A shifting pin 33 is carried by the arms 34 and 35 of a yoke 36 formed on one end of the lever 28 and passes through the groove 15 in the control sleeve 14 below the driven shaft 18, as viewed in Fig. 1. The other end of the lever 28 can be attached to a suitable actuating mechanism, not shown. A horizontally extending headed stud 37 is fastened to the lever 28 by a nut 38 and a lockwasher 39. The stud 37 is engaged by one end of a tapered, flat spring 40. The other end of the spring 40 rests on a flange 41 formed on a support bracket 42. A finger 43 formed on the flange 41 extends through a hole 44 formed in the end of the spring 40 to hold the spring in position. The bracket 42 is fastened to the boss 30 by two screws 45 passing through the base of the bracket 40. An adjusting screw support plate 46 depends from the bracket 42 and extends below and substantially parallel to the flat spring 40. An adjusting screw 47 is threaded through the support plate 46 and engages the flat spring 40. Turning the screw 47 increases or decreases the tension of the spring 40.

In view of the above description, it is believed that the operation and advantages of the invention will be readily understood. Most previous electric clutch-brake driving devices of this type employ a coil spring to urge the brake into engagement and provide no means for adjusting the spring tension. Therefore as the friction surfaces wear and the position of the actuating lever changes, the tension in the spring when the brake is engaged also changes. A few cumbersome tension adjusting devices have been devised but are not completely satisfactory. My invention provides a simple and effective adjustment for the tension of the brake engaging spring. Normally, when no operating force is applied to the lever 28 to pivot it counterclockwise about the pin 29 as viewed in Fig. 1, the brake ring 21 is held in engagement with the brake element 25 by the spring 40 which urges the lever 28 clockwise about the pin 29. The force exerted on the lever 28 by the spring 40 can be varied by turning the screw 47. As the screw 47 is turned to apply pressure to the spring 40, the force applied to the lever 28 is increased. If the screw 47 is turned in the opposite direction, the force applied to the lever by the spring 40 is reduced until, eventually, the end of the spring 40 engaging the stud 37 does not rise sufficiently to cause the brake ring 21 to engage the brake element 25 but only moves the clutch ring 20 out of engagement with the clutch element 23. Under these conditions, the disc 19 and the driven shaft 18 may be rotated freely. Of course, as the friction surfaces wear, the clearance between them must be adjusted periodically. After adjustment of the clearance, the position of the lever 28 in the brake engaged position is changed. In order to keep the same brake engaging pressure on the spring 40, it is only necessary to turn the adjusting screw 47 until the desired pressure is obtained. The spring 40 can be removed and replaced by merely backing the screw 47 off enough to permit the spring 40 to pass over the head of the stud 37 and drop off of the finger 43. Of course, both the spring 40 and the bracket 42 can be removed upon the removal of the two screws 45.

From the above description, it is apparent that my invention provides a clutch-brake driving device with a normally engaged brake which is urged into engagement by a variable tension spring device. Further, the spring device is provided with means for readily adjusting the tension of the spring without affecting the spring mounting.

Having thus set forth the nature of my invention, what I claim herein is:

1. An electric clutch-brake driving device having a casing, a clutch and brake mechanism disposed within said casing, an actuating lever pivotally fastened to said casing and operatively connected to said clutch and brake mechanism, a return spring bracket fastened to said casing, a leaf-type return spring having one end supported on said bracket and the other end engaging said lever, and an adjusting screw carried by said bracket and engaging said spring between its ends.

2. A clutch-brake driving device comprising a casing, a clutch and brake mechanism disposed within said casing including a control sleeve, an actuating lever pivotally carried by said casing and connected to said sleeve, a spring support bracket carried by said casing, a flat spring having one end supported and positioned by said bracket, a tension adjusting screw carried by said bracket and engaging said spring, and an abutment carried by said lever and engaged by the other end of said spring.

3. A clutch-brake driving device comprising a casing, a brake mechanism disposed within said casing, an actuating lever pivotally connected to said casing, a control sleeve carried by said casing and operatively connected to said lever, a support bracket carried by said casing, a spring abutment carried by said lever, a leaf spring having one side engaging said support bracket and said abutment, and a tension adjusting screw carried by said bracket engageable with the opposite side of said spring.

4. A clutch-brake driving device comprising a casing, a brake mechanism disposed within said casing, a control sleeve carried by said casing and operatively connected to said brake mechanism, an actuating lever pivotally carried by said casing and operatively connected to said control sleeve, a spring support bracket fastened to said casing, a spring positioning member formed on said bracket, a spring abutment carried by said lever, a flat spring engaging said member and said abutment, and a tension adjusting screw carried by said bracket and engageable with said spring.

5. An electric clutch-brake driving device comprising a casing, a clutch and brake mechanism disposed within said casing, an electric motor carried by said casing, an actuating lever pivotally carried by said casing, a control sleeve operatively connected to said mechanism and said lever, a support bracket carried by said casing and having a depending positioning finger, a flat spring having one end supported by said bracket and engaging said finger and the other end of said spring operatively engaging said lever, and an adjusting screw carried by said bracket and engaging said spring.

6. A brake-engaging spring device adapted for use on a clutch-brake driving device including a casing, a clutch and brake mechanism, and an actuating lever pivotally fastened to said casing and operatively connected to said clutch and brake mechanism, said actuating lever having a spring abutment, comprising a spring support bracket adapted to be secured to said casing, said support bracket having a base, a flange bent at a right angle from said base and formed with a spring-locating finger, a support plate integral with and spaced from said base, an adjusting screw threaded into and extending through said support plate, and a leaf spring having an aperture adjacent to one end to receive said spring-locating finger and having its body positioned beneath the support plate to be engaged by said adjusting screw, the other end of said spring engaging said abutment.

7. An electric clutch-brake driving device comprising a casing; a clutch and brake mechanism disposed within said casing; a slidable control sleeve carried by said casing for controlling said clutch and brake mechanism; said sleeve being provided with an annular groove; a rotatable driven shaft concentric with and carried by said control sleeve; an actuating lever for said clutch and brake mechanism; a fulcrum pin carried by said casing and pivotally supporting said lever; actuating means carried by said lever and entering said groove; a spring abutment carried by said lever; a spring anchoring and locating device carried by said casing; a spring fulcrum carried by said casing; and a leaf spring engaging said abutment, fulcrum and spring anchoring and locating device.

References Cited in the file of this patent

UNITED STATES PATENTS

| Number | Name | Date |
|---|---|---|
| 326,876 | Kramer et al. | Sept. 22, 1885 |
| 1,927,973 | Bull | Sept. 26, 1933 |
| 2,150,867 | Voigt | Mar. 14, 1939 |
| 2,269,788 | Schenk | Jan. 13, 1942 |